United States Patent
Na et al.

(10) Patent No.: US 11,082,879 B2
(45) Date of Patent: Aug. 3, 2021

(54) BASE STATION DEVICE, TERMINAL APPARATUS AND QOS CONTROL METHOD IN WIRELESS SECTION

(71) Applicant: SK TELECOM CO., LTD., Seoul (KR)

(72) Inventors: Min Soo Na, Seoul (KR); Chang Soon Choi, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 16/240,083

(22) Filed: Jan. 4, 2019

(65) Prior Publication Data

US 2019/0150022 A1    May 16, 2019

Related U.S. Application Data

(63) Continuation of application No. PCT/KR2017/006937, filed on Jun. 30, 2017.

(30) Foreign Application Priority Data

Oct. 17, 2016 (KR) ........................ 10-2016-0134457

(51) Int. Cl.
*H04B 7/216* (2006.01)
*H04W 28/02* (2009.01)
*H04W 28/10* (2009.01)
*H04W 36/00* (2009.01)
*H04W 88/08* (2009.01)

(52) U.S. Cl.
CPC ....... *H04W 28/0236* (2013.01); *H04W 28/02* (2013.01); *H04W 28/0257* (2013.01); *H04W 28/0263* (2013.01); *H04W 28/0268* (2013.01); *H04W 28/10* (2013.01); *H04W 36/0044* (2013.01); *H04W 88/08* (2013.01)

(58) Field of Classification Search
None
See application file for complete search history.

(56) References Cited

U.S. PATENT DOCUMENTS 7,948,936 B2 * 5/2011 Lohr .................. H04L 47/2425
                                                                370/329
8,917,625 B2   12/2014 Li et al.
9,860,154 B2 * 1/2018 Balabine ............... H04L 63/102
(Continued)

FOREIGN PATENT DOCUMENTS

KR   10-2005-0089627 A    9/2005
KR   10-2008-0098302 A   11/2008
(Continued)

OTHER PUBLICATIONS

International Search Report dated Sep. 29, 2017, issued in corresponding International Patent Application No. PCT/KR2017/006937.
(Continued)

*Primary Examiner* — Gerald A Smarth
(74) *Attorney, Agent, or Firm* — Hauptman Ham, LLP

(57) ABSTRACT

Disclosed is technology for applying a differential QoS, that is, service quality for each communication service by implementing a differential QoS control in a radio section in a more detailed unit without an increase in complexity and load compared to a conventional bearer-based QoS control method.

12 Claims, 9 Drawing Sheets

(56) References Cited

U.S. PATENT DOCUMENTS

| | | | | |
|---|---|---|---|---|
| 2009/0279430 | A1* | 11/2009 | Huber | H04L 45/302 370/230.1 |
| 2010/0208609 | A1* | 8/2010 | Sundarraman | H04L 47/10 370/252 |
| 2013/0155903 | A1* | 6/2013 | Bi | H04L 67/322 370/255 |
| 2014/0153392 | A1* | 6/2014 | Gell | H04W 28/0236 370/230 |
| 2014/0155043 | A1* | 6/2014 | Gell | H04W 4/60 455/414.1 |
| 2014/0341031 | A1* | 11/2014 | Mutikainen | H04W 28/0268 370/235 |
| 2015/0063144 | A1* | 3/2015 | Kozat | H04W 24/02 370/252 |
| 2015/0271838 | A1* | 9/2015 | Szilagyi | H04W 72/1263 370/336 |
| 2017/0048845 | A1* | 2/2017 | Chen | H04W 72/0413 |
| 2017/0079075 | A1* | 3/2017 | Han | H04W 72/0486 |
| 2018/0249365 | A1* | 8/2018 | Cho | H04W 28/0263 |

FOREIGN PATENT DOCUMENTS

| | | |
|---|---|---|
| KR | 10-0909105 A | 7/2009 |
| KR | 10-2010-0072200 A | 6/2010 |
| KR | 10-2012-0027476 A | 3/2012 |
| KR | 10-2014-0036901 | 3/2014 |
| KR | 10-1447207 B1 | 10/2014 |
| WO | 2015/149271 A1 | 10/2015 |
| WO | 2016/163808 A1 | 10/2016 |

OTHER PUBLICATIONS

Korean Office Action dated Dec. 10, 2018, issued in corresponding Korean Patent Application No. 10-2017-0094896.
The Extended European Search Report for PCT/KR2017006937 dated Jan. 29, 2020.
Nokia, Radio Bearer Operation, 3GPP TSG-RAN WG2 Ad-hoc on LTE, R2-061845, Jun. 27-30, 2006, Cannes, France.
ZTE, LBI clarification, 3GPP TSG-SA WG2 Meeting #64, S2-082371, Apr. 7-11, 2008, Jeju, Korea.
ZTE Corporation, CATR, New QoS Architecture, SA WG2 Meeting #114, S2-161755, Apr. 11-15, 2016, Sophia Antipolis, France.
Thomas DeiB, et al., Chapter 8: QoS, Mobile Backhaul, May 7, 2012, pp. 250-302, Wiley & Sons, Ltd., ISBN: 978-1-119-97420-8.
Japanese Office Action dated Apr. 2, 2020 in connection with the counterpart Japanese Patent Application No. 2019-506490.

* cited by examiner

BASE STATION DEVICE, TERMINAL APPARATUS AND QOS CONTROL METHOD IN WIRELESS SECTION

CROSS-REFERENCE TO RELATED APPLICATIONS

The present application is a continuation of International Application No. PCT/KR2017/006937 filed on Jun. 30, 2017, which is based on, and claims priority from, Korean Patent Application No. 10-2016-0134457, filed on Oct. 17, 2016, the entire contents of which are incorporated herein by reference.

BACKGROUND OF THE INVENTION

1. Field of the Invention

The present disclosure relates to controlling a QoS to transmit packets at different QoS levels. More particularly, the present disclosure relates to technology for implementing a differential QoS control more precisely without an increase in complexity and load compared to a conventional bearer-based QoS control method.

2. Description of the Prior Art

In a mobile communication system, a Quality of Service (QoS) level varies depending on a media type of a communication service, and a QoS control is provided for transmitting a packet of the communication service used by a terminal (user) at a guaranteed QoS level suitable for the media type.

In connection with this, a QoS control method provided by an LTE network is an EPS bearer (hereinafter, referred to as a bearer) based QoS control method.

In the LTE network, the terminal (user) generates an EPS bearer, that is, a bearer for transmitting data to use a communication service.

The bearer may be a tunnel (a radio section+a wired section) generated between a terminal and a P-GW via the radio section for connecting the terminal and a Base Station (BS) and the wired section for connecting the BS, an S-GW and the P-GW.

Data of the user (terminal) is transmitted in the form of an IP-based packet through the tunnel, that is, the bearer, and a traffic flow according to packet transmission is referred to as a service flow.

Conventionally, types of communication services were relatively limited and thus a bearer-based QoS control method of grouping several types of application services and applying the QoS based on a logical unit of "bearers" is used.

Accordingly, the conventional bearer-based QoS control method defines a QoS level (QoS parameter) for each bearer and guarantees the QoS based on bearers, so that service flows transmitted through one bearer are all guaranteed and transmitted with the same QoS (QoS level of the bearer).

As a result, the conventional bearer-based QoS control method has an advantage in that complexity of the QoS control can be reduced but has a limit in that a differential QoS cannot be applied to service flows belonging to one bearer.

The limit of the bearer-based QoS control method is not a big problem in a situation in which types of communication services are relatively limited.

However, in a current or future situation (for example, 5G) in which various types of communication services have been developed/introduced rapidly, it is required to improve the limit of the bearer-based QoS control method.

Therefore, an aspect of the present disclosure is to improve the limit of the conventional bearer-based QoS control method by implementing a differential QoS control more precisely.

SUMMARY OF THE INVENTION

An aspect of the present disclosure is to implement a differential QoS control more precisely without an increase in complexity and load compared to a conventional bearer-based QoS control method.

In accordance with an aspect of the present disclosure, a BS apparatus is provided. The BS apparatus includes: an identification unit configured to identify a radio section-dedicated Quality of Service (QoS) parameter mapped to a QoS parameter applied to a service flow of a packet to be transmitted to a terminal; and a transmission unit configured to apply the radio section-dedicated QoS parameter in transmission of the packet and transmit the packet at a radio section-dedicated QoS level converted from a QoS level applied by a core network.

Specifically, the BS apparatus may further include a storage unit configured to store a mapping table in which a radio section-dedicated QoS parameter is mapped to each QoS parameter which the core network applies to a service flow, wherein the number of QoS parameter within the mapping table may be larger than the number of radio section-dedicated QoS parameter.

Specifically, the BS apparatus may further include a storage unit configured to store a mapping table in which a radio section-dedicated QoS parameter is mapped to each QoS parameter which the core network applies to a service flow, wherein two or more different QoS parameters may be mapped to one radio section-dedicated QoS parameter in the mapping table.

Specifically, the two or more different QoS parameters may be applied to an Internet of Things (IoT) service or a communication service in which the core network periodically transmits a small amount of data having a size equal to or smaller than a particular size.

Specifically, the BS apparatus may further include a storage unit configured to store a mapping table in which a radio section-dedicated QoS parameter is mapped to each QoS parameter which the core network applies to a service flow, wherein, with respect to one service flow to which a particular QoS parameter is applied, a radio section-dedicated QoS parameter may be mapped to QoS of each content included in the one service flow in the mapping table.

Specifically, the particular QoS parameter may have a service type of a non-Guaranteed Bit Rate (GBR) that does not guarantee a bandwidth.

Specifically, when the QoS parameter applied to the one service flow is the particular QoS parameter, the identification unit may check a particular field for identifying a service quality type (DiffServ) in a header of the packet to identify the QoS of content and identify a radio section-dedicated QoS parameter mapped to the identified QoS of content.

Specifically, the BS apparatus may further include a control information transfer unit configured to transmit an RRC message including QoS control information for identifying the radio section-dedicated QoS parameter to the terminal, thereby allowing the terminal to transmit an uplink packet of the service flow at the radio section-dedicated QoS level, based on the QoS control information within the RRC message.

In accordance with another aspect of the present disclosure, a method of controlling a QoS in a radio section is provided. The method includes: an identification step of identifying, based on a QoS parameter applied to a service flow of a packet to be transmitted to a terminal, a radio section-dedicated QoS parameter mapped to the QoS parameter by a Base Station (BS) apparatus; and a transmission step of applying the radio section-dedicated QoS parameter in packet transmission and transmitting the packet at a radio section-dedicated QoS level converted from a QoS level applied by a core network, by the BS apparatus.

Specifically, the method may further include a step of storing a mapping table in which a radio section dedicated QoS parameter is mapped to each QoS parameter which the core network applies to a service flow by the BS apparatus, wherein the number of QoS parameter within the mapping table may be larger than the number of radio section-dedicated QoS parameter.

Specifically, the method may further include a step of storing a mapping table in which a radio section-dedicated QoS parameter is mapped to each QoS parameter which the core network applies to a service flow by the BS apparatus, wherein two or more different QoS parameters may be mapped to one radio section-dedicated QoS parameter in the mapping table.

Specifically, the method may further include a step of storing a mapping table in which a radio section-dedicated QoS parameter is mapped to each QoS parameter which the core network applies to a service flow by the BS apparatus, wherein, with respect to one service flow to which a particular QoS parameter is applied, a radio section-dedicated QoS parameter may be mapped to QoS of each content included in the one service flow in the mapping table.

Specifically, the identification step may include, when the QoS parameter applied to the one service flow is the particular QoS parameter, checking a particular field for identifying a service quality type (DiffServ) in a header of the packet to identify the QoS of content and identifying a radio section-dedicated QoS parameter mapped to the identified QoS of content.

In accordance with an aspect of the present disclosure, a terminal apparatus is provided. The terminal apparatus includes: a receiving unit configured to receive a downlink packet from a base station; an identifying unit configured to identify a radio section-dedicated Quality of Service (QoS) parameter applied to the downlink packet; a transmitting unit configured to applied an uplink packet to which the radio section-dedicated QoS parameter is applied.

Specifically, the identifying unit may identify the radio section-dedicated QoS parameter applied to a service flow of the downlink packet.

Specifically, the identifying unit may identify the service flow of the downlink packet based on at least one of a source IP, a destination IP, a source port, a destination port, and a protocol ID included in the downlink packet.

According to an embodiment of the present disclosure, it is possible to derive an effect of applying a differential QoS, that is, a service quality for each communication service by implementing a differential QoS control in a radio section more precisely without an increase in complexity and load compared to a conventional bearer-based QoS control method.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
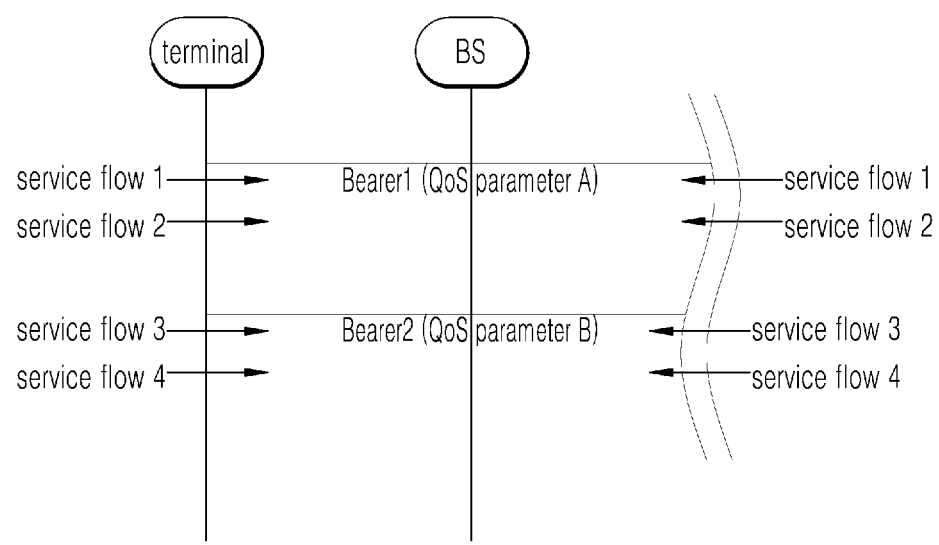
FIG. 1 illustrates an example of a conventional bearer-based QoS control method.

It should be noted that the technical terms as used herein are merely used for describing particular embodiments, and are not intended to limit the scope of the present disclosure. Further, the technical terms in the specification should be construed as a meaning generally understood by those skilled in the art unless the terms are defined as another meaning and should not be construed as an excessively inclusive meaning or an excessively exclusive meaning. When a technical term used in the specification is an incorrect technical term which does not accurately express the idea of the present disclosure, the technical term should be replaced with the correct technical term which can be understood by those skilled in the art. Further, the general terms used in the present disclosure should be interpreted in the context according to the dictionary definition and should not be construed as possessing an excessively limited meaning.

In addition, a singular expression used in the specification includes a plural expression as long as they are clearly distinguished in the context. In the present disclosure, the term "comprise" or "include" should not be construed as necessarily including all of various elements or various steps disclosed herein, and it should be understood that some of the elements or steps may not be included, or additional elements or steps may be further included.

In addition, although terms including ordinal numbers such as first, second, and the like may be used to describe various elements, the elements should not be restricted by the terms. The terms are used merely for the purpose to distinguish an element from the other elements. For example, a first element may be termed a second element, and similarly, a second element may be termed a first element without departing from the scope of the present disclosure.

Hereinafter, embodiments of the present disclosure will be described in detail with reference to the accompanying drawings, equal or similar elements are assigned an equal reference numeral, and an overlapping description thereof will be omitted.

Further, in the following description of the technology of the present disclosure, a detailed description of known technologies incorporated herein will be omitted when it may make the subject matter of the present disclosure rather unclear. Further, it should be noted that the accompanying drawings are intended only for the easy understanding of the technical idea of the present disclosure, and the technical idea should not be construed as being limited by the accompanying drawings.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

Hereinafter, embodiments of the present disclosure will be described with reference to the accompanying drawings.

Prior to a detailed description of the present disclosure, the conventional bearer-based QoS control method will be described with reference to FIG. 1.

The conventional bearer-based QoS control method is a method of grouping of several types of communication services and applying (guaranteeing) a QoS based on the logical unit of an EPS bearer, that is, a bearer.

A terminal (user) generates an EPS bearer, that is, a bearer for transmitting data to use a communication service.

At this time, as illustrated in FIG. 1, in order to use the bearer-based QoS control method, bearers, for example, bearers 1 and 2 are generated to guarantee a QoS required for a communication service which the terminal (user) desires to use.

Each of bearers 1 and 2 may be default bearers or dedicated bearers.

It is assumed that service flow 1 of communication service 1 used by the terminal and service flow 2 of communication service 2 belong to one bearer (bearer 1) and service flow 3 of communication service 3 used by the terminal and service flow 4 of communication service 4 belong to one bearer (bearer 2) in FIG. 1.

In this case, as illustrated in FIG. 1, the same QoS, that is, a QoS level (QoS parameter A) of bearer 1 is applied to both service flows 1 and 2 transmitted through bearer 1, and the same QoS, that is, a QoS level (QoS parameter B) of bearer 2 is applied to both service flows 3 and 4 transmitted through bearer 2.

As a result, the conventional bearer-based QoS control method has an advantage in that complexity in the QoS control can be reduced through application of the QoS based on a logical unit of bearer, but has a limit in that differential QoS cannot be applied to service flows belonging to one bearer.

Accordingly, the present disclosure proposes a method of realizing a differential QoS control more precisely than the conventional bearer-based QoS control method. Particularly, the method is realized in a radio section which may be a key of the QoS control.

However, when the differential QoS control is realized more precisely, complexity and load of the QoS control may increase compared to the conventional bearer-based QoS control method.

Accordingly, the present disclosure proposes a method (hereinafter, referred to as a radio section QoS control method) of implementing the differential QoS control more precisely in the radio section while minimizing the increase in complexity and load compared to the conventional bearer-based QoS control method.

Hereinafter, an apparatus, that is, a BS apparatus for implementing the radio section QoS control method proposed by the present disclosure will be described in detail.

A procedure for implementing the radio section QoS control method will be described below with reference to FIG. 2.

A core network 20 transfers a mapping rule to a BS 100 in S1. The mapping rule is for converting a QoS parameter, which the core network 20 applies to a service flow, into a radio section-dedicated QoS parameter.

At this time, the core network 20 may support the conventional bearer-based QoS control method.

In this case, the QoS parameter, which the core network 20 applies to the service flow, is the same as a QoS parameter (QoS level) of a bearer to which the corresponding service flow belongs, and accordingly, the mapping rule transferred to the BS 100 may be a mapping rule for converting a bearer-based QoS parameter applied to the service flow into a radio section-dedicated QoS parameter.

Further, the core network 20 may support a service flow-based QoS control method that guarantees (applies) a different QoS based on service flows unlike the conventional bearer-based QoS control method.

In this case, the QoS parameter, which the core network 20 applies to the service flow, is the same as a QoS parameter (QoS level) defined for the service flow, and accordingly, the mapping rule transferred to the BS 100 may be a mapping rule for converting a service flow-based QoS parameter applied to the service flow into a radio section-dedicated QoS parameter.

However, the radio section QoS control method proposed by the present disclosure may obtain the same effect described below through the same configuration described below regardless of whether the core network 20 supports the bearer-based QoS control method or the service flow-based QoS control method.

Accordingly, the following description of the present disclosure will be made without distinction about whether the core network 20 supports the bearer-based QoS control method or the service flow-based QoS control method.

The BS 100 may set a mapping rule transferred from the core network 20 in S2.

At this time, information stored in the BS 100 through setting of the mapping rule may have a form of a mapping table in which a radio section-dedicated QoS parameter is mapped for each QoS parameter (bearer-based QoS parameter or service flow-based QoS parameter) which the core network 20 applies to the service flow.

Further, the BS 100 may insert QoS control information for identifying the radio section-dedicated QoS parameter, which the BS 100 applies for each service flow, into a Radio Resource Control (RRC) message and transmit the RRC message to the terminal 10 in an RRC establishment process (S3) with the terminal 10 which accesses the BS 100.

Accordingly, the terminal 10 may set the QoS control information provided from the BS 100 in S4.

At this time, the QoS control information may include a radio section-dedicated QoS parameter applied to a service flow which the BS 100 provides to the terminal 10.

When the BS 100 receives a packet to be transmitted to the terminal 10 from the core network 20 in S5, the BS 100 identifies a QoS parameter (for example, QoS parameter A) applied to a service flow of this packet.

Further, the BS 100 identifies a radio section-dedicated QoS parameter mapped to the QoS parameter applied to the identified service flow in the set/stored mapping table in S6.

That is, the BS 100 converts a QoS level on the core network 20 into a radio section-dedicated QoS level by mapping the QoS parameter (for example, QoS parameter A), which the core network 20 applies to this packet (service flow), to the radio section-dedicated QoS parameter (for example, QoS parameter 1) in S6.

Thereafter, when transmitting this packet to the terminal 10, the BS 100 transmits this packet at the radio section-dedicated QoS level converted from the QoS level applied by the core network 20 by applying the identified radio section-dedicated QoS parameter (for example, QoS parameter 1) in S7.

Further, when an uplink packet is generated in S8, the terminal 10 may transmit the uplink packet at the same radio section-dedicated QoS level as that of the downlink by equally applying the radio section-dedicated QoS parameter (for example, QoS parameter 1), which the BS 100 applies in the downlink of this service flow, to transmission of the uplink packet on the basis of the received and set QoS control information in S9.

When the BS 100 receives the uplink packet from the terminal 10, the BS 100 transmits this uplink packet at a QoS level of the core network 20 converted from the radio section-dedicated QoS level by mapping the radio section-dedicated QoS parameter (for example, QoS parameter 1) to the QoS parameter (for example, QoS parameter A) applied by the core network 20 by inversely performing the QoS mapping of step S6 and then applying the QoS parameter (for example, QoS parameter A) to transmission of the uplink packet in S10.

Hereinafter, an apparatus, that is, a BS apparatus for implementing the radio section QoS control method according to the embodiment of the present disclosure will be described with reference to FIG. 3.

Figure 2:
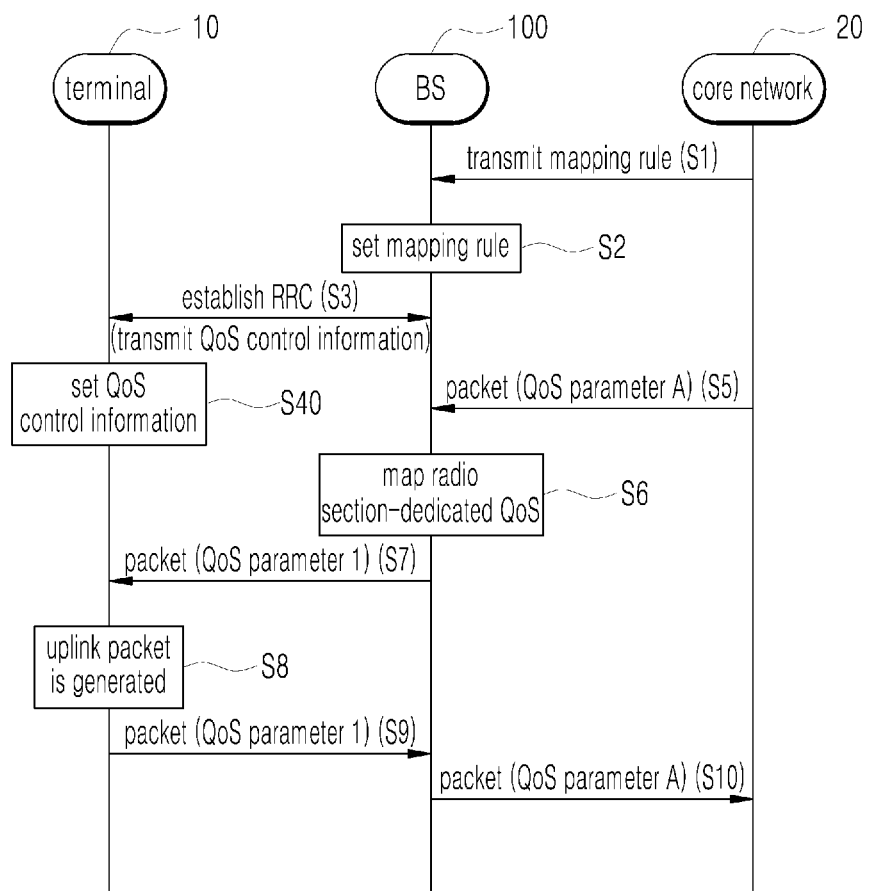
FIG. 2 illustrates an example of a flow for implementing a radio section QoS control method according to an embodiment of the present disclosure.

For convenience of description, the reference numeral of the BS 100 in FIG. 2 will be equally used.

Figure 3:
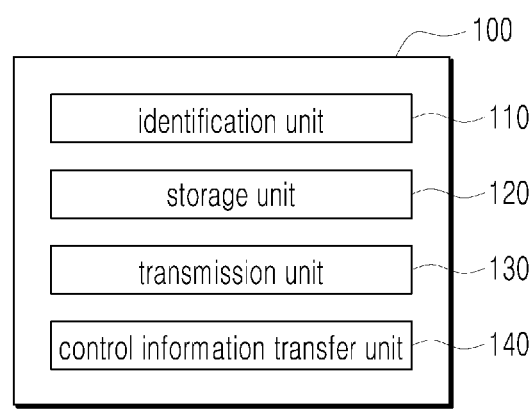
FIG. 3 is a block diagram illustrating the configuration of a BS apparatus according to an embodiment of the present disclosure.

As illustrated in FIG. 3, with respect to a packet to be transmitted to the terminal, the BS apparatus 100 according to the present disclosure includes an identification unit 110 configured to identify a radio section-dedicated QoS parameter mapped to a QoS parameter applied to a service flow of the packet and a transmission unit 130 configured to transmit the packet at a radio section-dedicated QoS level converted from a QoS level applied by the core network by applying the identified radio section-dedicated QoS parameter to transmission of the packet.

Here, the terminal is a terminal accessing the BS apparatus 100 and using a communication service, and may use a plurality of communication services through the BS apparatus 100 simultaneously.

Hereinafter, the terminal 10 illustrated in FIG. 2 will be described as the terminal.

When receiving a packet to be transmitted to the terminal 10 from the core network 20, the identification unit 110 identifies a QoS parameter applied to a service flow of the corresponding packet.

For example, a header of the downlink packet received from the core network 20 may include the QoS parameter which the core network 20 applies to the service flow of the corresponding packet.

In this case, the identification unit 110 may extract/identify the QoS parameter included in the header of the packet to be transmitted to the terminal 10 so as to identify the QoS parameter applied to the service flow of the packet.

Alternatively, the header of the downlink packet received from the core network 20 may include a separate QoS identifier for identifying the QoS parameter, which the core network 20 applies to the service flow of the corresponding packet.

In this case, the identification unit 110 may extract/identify the QoS parameter included in the header of the packet to be transmitted to the terminal 10 so as to identify the QoS parameter applied to the service flow of the packet.

Alternatively, the BS apparatus 100 may include policy information indicating which QoS parameter (the bearer-based QoS parameter or the service flow-based QoS parameter) will be applied to each service flow by the core network 20.

In this case, the identification unit 110 identifies the service flow of the packet on the basis of 5-tuple within the header of the packet to be transmitted to the terminal 10, that is, a source IP, a destination IP, a source port, a destination port, and a protocol ID.

Further, the identification unit 110 may identify a QoS parameter which the core network 20 will apply to the identified service flow on the basis of the policy information so as to identify the QoS parameter which the core network 20 applies to the service flow of the packet.

In addition, when the QoS parameter applied to the service flow of the packet is identified, the identification unit 110 identifies a radio section-dedicated QoS parameter mapped to the QoS parameter.

To this end, the BS apparatus 100 according to the present disclosure may further include a storage unit 120 configured to store a mapping table in which the radio section-dedicated QoS parameter is mapped for each QoS parameter which the core network 20 applies to the service flow.

More specifically, a predetermined specific device (not shown) within the core network 20 transfers, to the BS apparatus 100, a mapping rule for converting the QoS parameter applied to the service flow to the radio section-dedicated QoS parameter.

At this time, the core network 20 may support the conventional bearer-based QoS control method.

In this case, the QoS parameter, which the core network 20 applies to the service flow, is the same as a QoS parameter (QoS level) of a bearer to which the corresponding service flow belongs, and accordingly, the mapping rule transferred to the BS apparatus 100 may be a mapping rule for converting the QoS parameter (bearer-based QoS parameter) applied to the service flow into the radio section-dedicated QoS parameter.

Further, the core network 20 may support a service flow-based QoS control method that guarantees (applies) a different QoS based on service flows unlike the conventional bearer-based QoS control method.

In this case, the QoS parameter, which the core network 20 applies to the service flow, is the same as the QoS parameter (QoS level) defined for each service flow, and accordingly, the mapping rule transferred to the BS apparatus 100 may be a mapping rule for converting the QoS parameter applied to the service flow (service flow-based QoS parameter) into the radio section-dedicated QoS parameter.

However, the radio section QoS control method proposed by the present disclosure may obtain the same effect described below through the same configuration described below regardless of whether the core network 20 supports the bearer-based QoS control method or the service flow-based QoS control method.

Accordingly, the following description of the present disclosure will be made without distinction about whether the core network 20 supports the bearer-based QoS control method or the service flow-based QoS control method.

The BS apparatus 100 sets the mapping rule transferred from the core network 20, and the storage unit 120 stores a mapping table in which the radio section-dedicated QoS parameter is mapped to the QoS parameter, which the core network 20 applies to the service flow (the bearer-based QoS parameter or the service flow-based QoS parameter) in a process of setting the mapping rule.

When the QoS parameter applied to the service flow of the packet is identified, the identification unit 110 identifies the radio section-dedicated QoS parameter mapped to the QoS parameter in the mapping table stored in the storage unit 120.

That is, the identification unit 110 converts a QoS level on the core network 20 into a radio section-dedicated QoS level by mapping the QoS parameter which the core network 20 applies to this packet (service flow) to the radio section-dedicated QoS parameter.

The transmission unit 130 transmits this packet at the radio section-dedicated QoS level converted from the QoS level, which the core network 20 applies, by applying the radio section-dedicated QoS parameter identified by the identification unit 110 to transmission of this packet to the terminal 10.

That is, when transmitting a downlink packet through a radio section, the transmission unit 130 transmits by applying the radio section-dedicated QoS parameter (QoS level) instead of the QoS parameter (QoS level) which the core network 20 applies to the service flow of the corresponding packet.

Then, the present disclosure separately implements a QoS control in a radio section, which is the most sensitive between the terminal and an access end (BS), that is, the core of the QoS control unlike the conventional QoS control method of applying the QoS to service flows in all sections (bearers) from the terminal to the core network.

That is, the radio section QoS control method according to the present disclosure may independently implement a differential QoS control based on DRBs in a radio section, which is separately from the QoS control method between the access and the core network, by defining the radio section among all sections (bearers) from the terminal to the core network as a Data Radio Bearer (DRB) which is a separate unit.

The radio section QoS control method according to the present disclosure has been described based on downlink traffic.

In order to apply the radio section QoS control method according to the present disclosure to uplink traffic, a process of providing information (QoS control information) required for a radio section QoS control to the terminal is needed, but the process may increase complexity and load as the QoS control is performed more precisely.

Accordingly, in the present disclosure, the information (QoS control information) required for the radio section QoS control should be provided to the terminal while the increase in complexity and load is minimized.

Specifically, as illustrated in FIG. 3, the BS apparatus 100 according to the present disclosure further includes a control information transfer unit 140.

The control information transfer unit 140 may transmit an RRC message including QoS control information for identifying the radio section-dedicated QoS parameter identified by the identification unit 110 to the terminal 10 and thus allow the terminal 10 to transmit an uplink packet of the same service flow at the radio section-dedicated QoS level on the basis of the QoS control information within the RRC message.

More specifically, when the terminal 10 accesses the BS apparatus 100 to use a communication service, a Radio Resource Control (RRC) establishment process is performed between the BS apparatus 100 and the terminal 10.

In the RRC establishment process, the control information transfer unit 140 may insert the QoS control information for identifying the radio section-dedicated QoS parameter which the BS apparatus 100 applies for each service flow provided to the terminal 10 into the RRC message and transmit the RRC message to the terminal 10.

The QoS control information may include a radio section-dedicated QoS parameter which the BS 100 applies to the service flow provided to the terminal 10.

For example, the QoS control information may be information for identifying the radio section-dedicated QoS parameter which the BS apparatus 100 applies for each service flow, the information having a form in which 5-tuple (a source IP, a destination IP, a source port, a destination port, and a protocol ID) used for distinguishing service flows and radio section-dedicated QoS parameters are mapped.

Accordingly, the terminal 10 may set the QoS control information provided from the BS apparatus 100 and may be aware of information (QoS control information) required for radio section QoS control, and thus may transmit an uplink packet at the same radio section-dedicated QoS level as that of the downlink by equally applying the radio section-dedicated QoS parameter, which the BS apparatus 100 applies in the downlink of this service flow, to transmission of the uplink packet.

The terminal 10 includes a receiving unit configured to receive a downlink packet from a base station, an identifying unit configured to identify a radio section-dedicated Quality of Service (QoS) parameter applied to the downlink packet, a transmitting unit configured to applied an uplink packet to which the radio section-dedicated QoS parameter is applied.

The identifying unit identifies the radio section-dedicated QoS parameter applied to a service flow of the downlink packet.

The identifying unit identifies the service flow of the downlink packet based on information included in the downlink packet.

The identifying unit identifies the service flow of the downlink packet on the basis of 5-tuple within the header of the downlink packet to received from the BS apparatus 100, that is, a source IP, a destination IP, a source port, a destination port, and a protocol ID.

The identifying unit identifies the radio section-dedicated QoS parameter using QoS control information.

The QoS control information may include a radio section-dedicated QoS parameter which the BS 100 applies to the service flow provided to the terminal 10.

For example, the QoS control information may be information for identifying the radio section-dedicated QoS parameter which the BS apparatus 100 applies for each service flow, the information having a form in which 5-tuple (a source IP, a destination IP, a source port, a destination port, and a protocol ID) used for distinguishing service flows and radio section-dedicated QoS parameters are mapped.

As described above, in the present disclosure, it is possible to minimize an increase in complexity and load through the use of only minimum messages and provide information (QoS control information) required for a radio section QoS control to the terminal by providing the QoS control information to the terminal in the RRC establishment process.

Meanwhile, on the basis of the definition of a mapping rule (mapping table), the radio section QoS control method proposed by the present disclosure may obtain different performances through the QoS control in the radio section.

Hereinafter, in the radio section QoS control method, various embodiments according to the definition of the mapping rule (mapping table) for the QoS control will be described.

First, an ideal example for applying detailed differential QoS through the radio section QoS control method according to the present disclosure may be a 1:1 mapping table of service flow:DRB that guarantees a different radio section-dedicated QoS level (DRB) based on service flows.

In the case of 1:1 mapping of service flow:DRB, since it is possible to guarantee an independent optimal radio section-dedicated QoS level (DRB) according to a media type for each service flow, the 1:1 mapping of service flow:DRB is the most excellent in the light of a differential QoS control based on service flows.

However, in the case of 1:1 mapping of service flow: DRB, there is a concern about a serious increase in complexity and load compared to the conventional QoS control method because of an overhead due to excessive mapping processing by the access end (BS) and costs due to management of a large number of DRBs.

Accordingly, the present disclosure proposes the following embodiment to define a mapping rule (mapping table) for QoS control.

However, hereinafter, it is assumed that the core network 20 supports the service flow-based QoS control method for convenience of description. On the basis of the assumption, a defined QoS parameter (QoS level) is applied to each service flow received by the core network 20.

According to a first embodiment, M:N mapping of service flow:DRB is proposed (M>N).

In the first embodiment, the number of QoS parameters within the mapping table is larger than the number of radio section-dedicated QoS parameters.

That is, an M:N mapping rule (mapping table) of the service flow and the DRB is defined such that M QoS parameters (QoS levels) applied to M service flows received by the core network 20, respectively are mapped to N radio section-dedicated QoS parameters (QoS levels), N being smaller than M.

In an embodiment of M:N of service flow:DRB, M:N mapping has a lower performance than 1:1 mapping in the light of a differential QoS control but is still excellent compared to the conventional bearer-based QoS control, and may reduce an increase in complexity and load because it is more excellent than 1:1 mapping in the light of overhead due to a mapping process by the access end (BS) and costs due to DRB management.

At this time, the relation between M QoS parameters and N radio section-dedicated QoS parameters may be determined when the mapping rule (mapping table) is defined.

According to a second embodiment, M:1 mapping of service flow:DRB is proposed.

In the second embodiment, two or more different QoS parameters are mapped to one same radio section-dedicated QoS parameter in the mapping table.

That is, an M:1 mapping rule (mapping table) of the service flow and the DRB is defined such that M QoS parameters (QoS levels) applied to M service flows received by the core network 20, respectively are mapped to one radio section-dedicated QoS parameter (QoS level).

At this time, M QoS parameters (QoS levels) applied to two or more, that is, M service flows may be QoS parameters (QoS levels) applied to an Internet of Things (IoT) service or a communication service in which the core network 20 periodically transmits a small amount of data lower than a particular size.

One of the communication services spotlighted in a 5G environment is a communication service, that is, an IoT service in which each of a plurality of remote terminals periodically collects and transmits a small amount of data lower than a particular size to the center (server).

In the IoT service, an IoT service of a specific IoT technology (Long Range: LoRa) that supports low speed transmission (<1 kbps) and low power in wide coverage has appeared.

Since the IoT service is specialized in wide coverage/low speed transmission (<1 kbps)/low power/small amount of data, the IoT service puts a larger weight on efficient operation of radio resources compared to a differential QoS control for each service flow in the radio section.

In an embodiment of M:1 of service flow:DRB, M service flows of the IoT service are mapped to the same one radio section-dedicated QoS parameter (QoS level) and thus the M:1 mapping is very excellent in the light of costs due to DRB management and overhead due to mapping processing by the access end (BS) and also efficiency in operation of radio resources is high, so that an increase in complexity and load may be reduced and the efficiency of operation of radio resources can be increased.

According to a third embodiment, 1:N mapping of service flow:DRB is proposed.

In the third embodiment, with respect to one service flow to which a particular QoS parameter is applied, radio section-dedicated QoS parameters are mapped to each QoS of each piece of content included in the service flow in the mapping table.

That is, a 1:N mapping rule (mapping table) of service flow:DRB is defined such that one particular QoS parameter (QoS level) applied to one service flow received by the core network 20 is mapped to N radio section-dedicated QoS parameters (QoS levels).

At this time, the particular QoS parameter has a service type of a Non-Guaranteed Bit Rate (GBR).

The QoS parameter applied by the core network 20 includes a service type (resource type), a QoS Class Identifier (QCI), and an Allocation and Retention Priority (ARP).

The service type corresponds to a parameter indicating a GBR that guarantees a bandwidth in transmission or a non-GBR that does not guarantee a bandwidth, the QCI is a parameter that indicates a QoS priority expressed by an integer from 1 to 9, and the ARP is a parameter that indicates creation or rejection when generation of a bearer according to a service flow is required. Of course, the QoS parameter may include other parameters as well as the above parameters.

Even one service flow, to which the QoS parameter of the non-GRB that does not guarantee the bandwidth is applied, may include packets of each piece of content having different QoS requirements.

In an embodiment of 1:N of service flow:DRB, with respect to one service flow to which a particular QoS parameter of a non-GBR is applied, different radio section-dedicated QoS parameters are mapped to each piece of content identified on the basis of a QoS, that is, QoS requirement of content included in the service flow, so that the radio section QoS control is differentially applied more precisely.

Particularly, in the third embodiment of 1:N mapping, an element for distinguishing each piece of content (content QoS) included in the service flow is further needed.

Accordingly, in the third embodiment, the identification unit 110 may receive a packet to be transmitted to the terminal 10 from the core network 20 and identify a QoS parameter applied to a service flow of the packet. When the QoS parameter is a particular QoS parameter of a non-GRB, the identification unit 110 may identify a QoS (QoS requirement) of content on the basis of a Differentiated Services Code Point (DSCP) field for identifying a service quality type (DiffServ) in a header of this packet (for example, an IP packet header).

Further, in the mapping table (1:N mapping) according to the third embodiment, the identification unit 110 identifies a radio section-dedicated QoS parameter mapped to the QoS (QoS requirement) of the content identified on the basis of the DSCP field.

In this packet transmission to the terminal 10, the transmission unit 130 applies the radio section-dedicated QoS parameter identified by the identification unit 110, that is, the radio section-dedicated QoS parameter for each piece of content included in one service flow but identified on the basis of the QoS (QoS requirement) of content and transmits this packet with a radio section-dedicated QoS level (for each piece of content within the service flow) converted from the QoS level applied by the core network 20.

In an embodiment of 1:N of the service flow:DRB, by mapping N different radio section-dedicated QoS parameters (QoS levels) to each piece of content included in one service flow, the performance may be very excellent compared to the conventional QoS control method (based on bearers or based on service flows) in the light of differential QoS control.

As described above, according to the radio section QoS control method according to an embodiment of the present disclosure, the QoS control in radio section between the terminal and the access end (BS) among the whole section from the terminal to the core network is separately implemented.

According to the radio section QoS control method according to an embodiment of the present disclosure, it is possible to acquire an effect of obtaining the QoS control performance through the radio section QoS control and minimizing an increase in complexity and load and also increasing efficiency in operation of radio resources through various embodiments for implementing the QoS control based on DRBs independently in the radio section and defining a mapping rule (mapping table).

According to the radio section QoS control method according to an embodiment of the present disclosure, it is possible to derive an effect of applying a more differential QoS, that is, a service quality for each communication service by implementing a differential QoS control in a radio section in a more detailed unit without an increase in complexity and load compared to a conventional bearer unit QoS control method.

Hereinafter, the radio section QoS control method according to various embodiments of the present disclosure will be described with reference to FIGS. 4 to 9.

The radio section QoS control method proposed by the present disclosure is implemented by the BS 100, and thus will be referred to as a radio section QoS control method of the BS 100 for convenience of description.

First, the radio section QoS control method according to a first embodiment of the present disclosure will be described below with reference to FIGS. 4 and 5.

Figure 4:
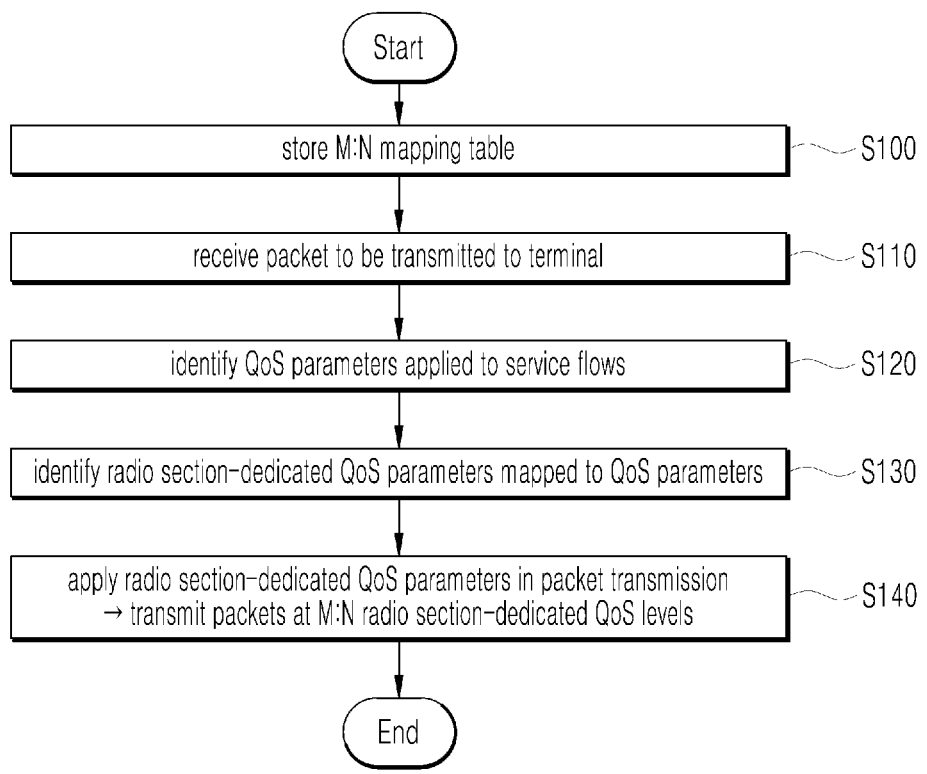
FIGS. 4 and 5 are flowcharts illustrating the radio section QoS control method according to a first embodiment of the present disclosure.

As illustrated in FIG. 4, in the radio section QoS control method according to the present disclosure, that is, the radio section QoS control method of the BS 100, a mapping table according to the first embodiment, that is, an M:N mapping table of service flow:DRB is stored in S100.

In the radio section QoS control method of the BS 100, when a packet to be transmitted to the terminal 10 is received in S110, QoS parameters applied to service flows of the corresponding packet, that is, QoS parameters applied by the core network 20 are identified in S120.

In the radio section QoS control method of the BS 100, when the QoS parameters are identified in S120, radio section-dedicated QoS parameters mapped to the QoS parameters are identified in the M:N mapping table in S130.

Further, in the radio section-dedicated QoS control method of the BS 100, the radio section-dedicated QoS parameters identified in S130 are applied in this packet transmission to the terminal 10 and this packet is transmitted at radio section-dedicated QoS levels converted from the QoS levels applied by the core network 20 in S140.

Figure 5:
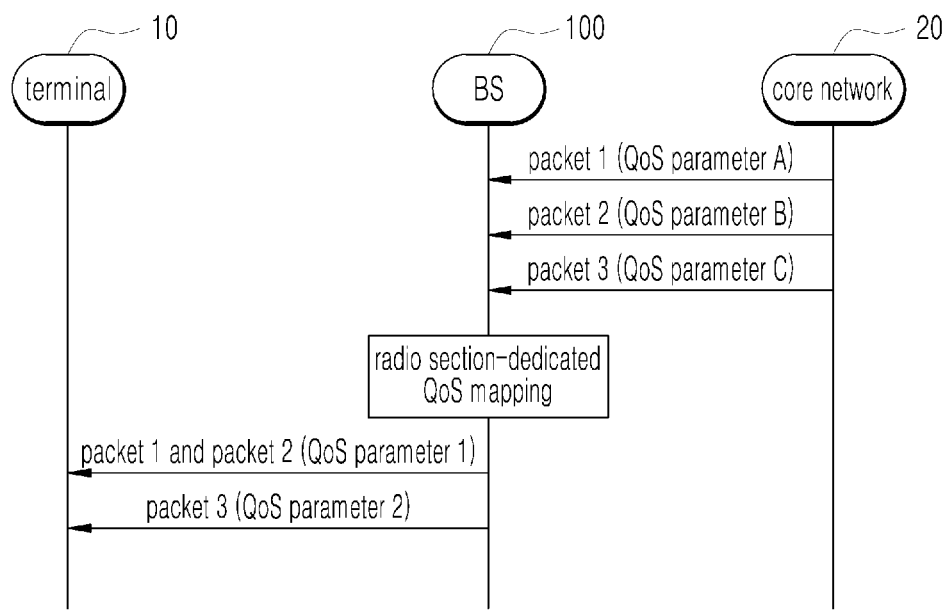

In FIG. 5, it is assumed that service flow packets 1, 2, and 3 to which different QoS parameters A, B, and C are applied, respectively, are received.

In this case, after identifying QoS parameters A, B, and C applied to service flows of packets 1, 2, and 3, respectively, the BS 100 identifies radio section-dedicated QoS parameters mapped to each of QoS parameters A, B, and C in the M:N mapping table to perform radio section-dedicated QoS mapping.

At this time, in the M:N mapping table, it is assumed that QoS parameters A and B are mapped to radio section-dedicated QoS parameter 1, and QoS parameter C is mapped to radio section-dedicated QoS parameter 2.

In this case, the BS 100 may apply radio section-dedicated QoS parameter 1 in transmission of packets 1 and 2 to the terminal 10 and apply radio section-dedicated QoS parameter 2 in transmission of packet 3 to the terminal 10, so as to transmit these packets 1, 2, and 3 at M:N radio section-dedicated QoS levels generated by converting the QoS levels applied by the core network 20 into the radio section-dedicated QoS levels.

Subsequently, the radio section QoS control method according to a second embodiment of the present disclosure will be described with reference to FIGS. 6 and 7.

Figure 6:
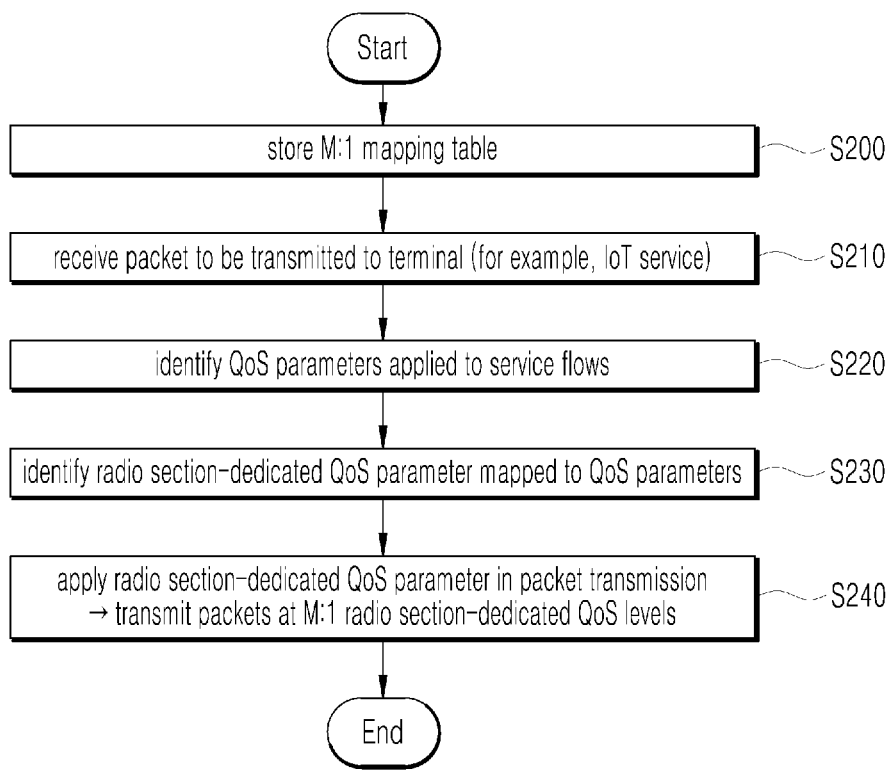
FIGS. 6 and 7 are flowcharts illustrating the radio section QoS control method according to a second embodiment of the present disclosure.

As illustrated in FIG. 6, in the radio section QoS control method according to the present disclosure, that is the radio section QoS control method of the BS 100, a mapping table according to the second embodiment, that is, an M:N mapping table of service flow:DRB is stored in S200.

In the radio section QoS control method of the BS 100, when a packet to be transmitted to the terminal 10 is received in S210, QoS parameters applied to service flows of the corresponding packet, that is, QoS parameters applied by the core network 20 are identified in S220.

In the radio section QoS control method of the BS 100, when the QoS parameters are identified in S220, radio section-dedicated QoS parameters mapped to the QoS parameters are identified in the M:N mapping table in S230.

Further, in the radio section-dedicated QoS control method of the BS 100, the radio section-dedicated QoS parameters identified in S230 are applied in this packet transmission to the terminal 10 and this packet is transmitted at radio section-dedicated QoS levels converted from the QoS levels applied by the core network 20 in S240.

Figure 7:
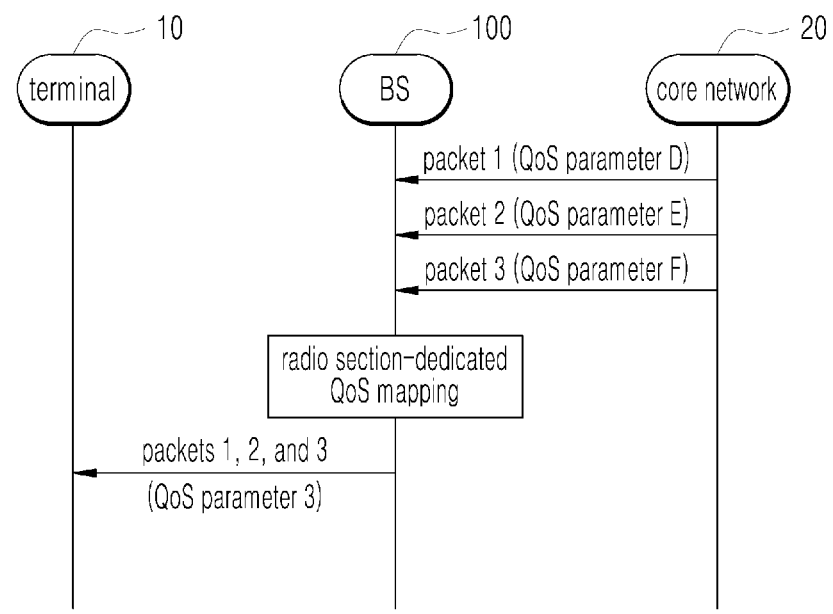

In FIG. 7, it is assumed that packets 1, 2, and 3 of respective service flows to which different QoS parameters D, E, and F are applied are received.

In this case, after identifying QoS parameters D, E, and F applied to service flows of packets 1, 2, and 3, the BS 100 identifies radio section-dedicated QoS parameters mapped to each of QoS parameters D, E, and F in the M:1 mapping table to perform radio section-dedicated QoS mapping.

At this time, it is assumed that service flows of packets 1, 2, and 3 are IoT services specialized in wide coverage/low speed transmission (<1 kbps)/low power/small amount of data.

Further, it is assumed that QoS parameters D, E, and F applied to the IoT services are mapped to radio section-dedicated QoS parameter 3 in the M:1 mapping table.

In this case, the BS 100 may apply radio section-dedicated QoS parameter 3 in transmission of packets 1, 2, and 3 to the terminal 10, so as to transmit these packets 1, 2, and 3 at M:1 radio section-dedicated QoS levels generated by converting QoS levels applied by the core network 20 into radio section-dedicated QoS levels.

Subsequently, the radio section QoS control method according to a third embodiment of the present disclosure will be described with reference to FIGS. 8 and 9.

Figure 8:
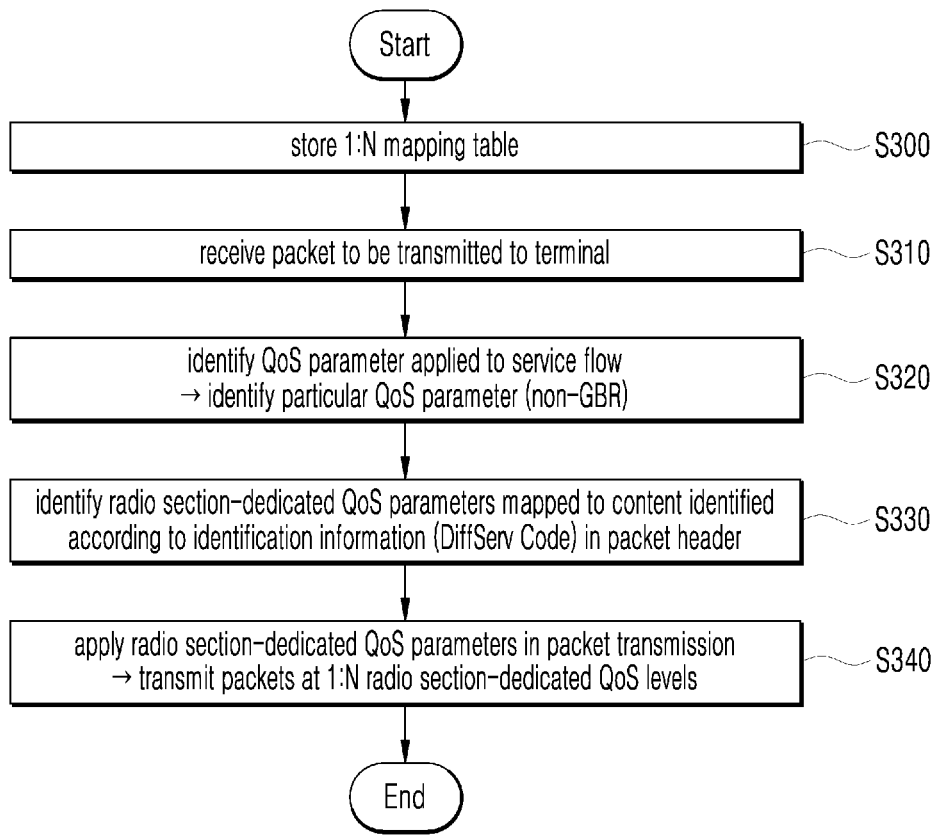
FIGS. 8 and 9 are flowcharts illustrating the radio section QoS control method according to a third embodiment of the present disclosure.

As illustrated in FIG. 8, in the radio section QoS control method according to the present disclosure, that is, the radio section QoS control method of the BS 100, a mapping table according to the third embodiment, that is, a 1::N mapping table of service flow:DRB is stored in S300.

In the radio section QoS control method of the BS 100, when a packet to be transmitted to the terminal 10 is received in S310, a QoS parameter applied to a service flow of the corresponding packet, that is, a QoS parameter applied by the core network 20 is identified in S320.

At this time, in the radio section QoS control method of the BS 100, when the QoS parameter identified in S320 is a particular QoS parameter of a non-GBR, a QoS (QoS requirement) of content may be identified on the basis of a Differentiated Services Code Point (DSCP) field for distinguishing a service quality type (DiffServ) in a header of this packet (for example, an IP packet header).

Further, in the radio section QoS control method of the BS 100, radio section-dedicated QoS parameters mapped to the QoS (QoS requirement) of content identified on the basis of the DSCP field are identified in the 1:N mapping table in S330.

According to the radio section QoS control method of the BS 100, in this packet transmission to the terminal 10, the radio section-dedicated QoS parameters identified in S330, that is, the radio section-dedicated QoS parameters for each piece of content included in one service flow but identified on the basis of the QoS (QoS requirement) of content are applied in this packet transmission to the terminal 10, this packet is transmitted at radio section-dedicated QoS levels (for each piece of content within the service flow) converted from the QoS level applied by the core network 20 in S340.

Figure 9:
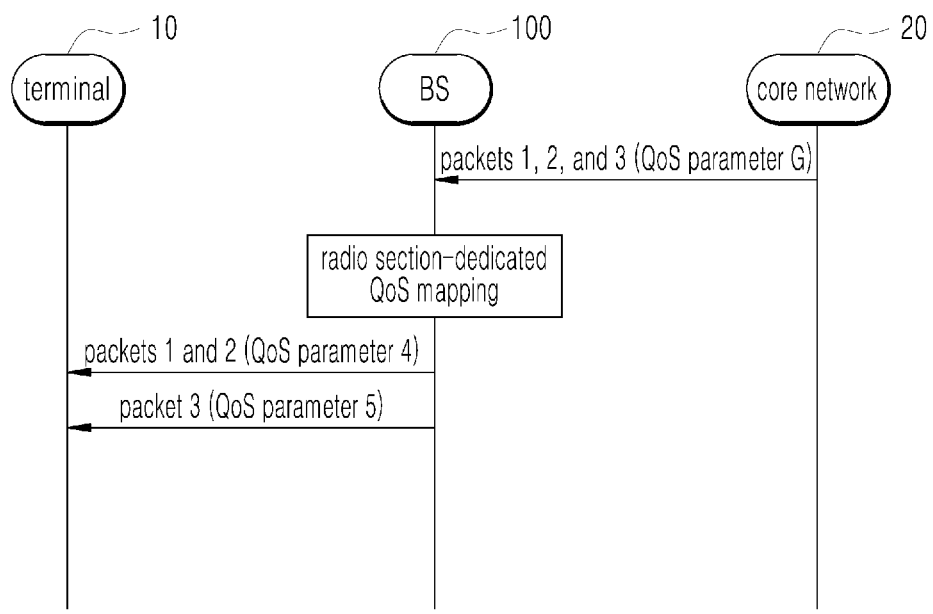

In FIG. 9, it is assumed that packets 1, 2, and 3 of service flows to which a QoS parameter (non-GBR) is applied are received.

In this case, when QoS parameter G applied to service flows of packets 1, 2, and 3 is identified and QoS parameter G is a particular QoS parameter of a non-GBR, the BS 100 identifies a QoS (QoS requirement) of content on the basis of the DSCP field in a header of each packet 1, 2, or 3.

At this time, it is assumed that packets 1 and 2 are identified as the same QoS content and packet 3 is identified as different QoS content.

In this case, the BS 100 identifies the radio section-dedicated QoS parameter mapped to content (QoS) of packets 1 and 2 and identifies the radio section-QoS parameter mapped to content (QoS) of packet 3 in the 1:M mapping table, so as to perform radio section-dedicated QoS mapping.

At this time, it is assumed that radio section-dedicated QoS parameter 4 is mapped to content of packets 1 and 2 included in one service flow and radio section-dedicated QoS parameter 5 is mapped to content of packet 3 in the 1:N mapping table.

In this case, the BS 100 may apply radio section-dedicated QoS parameter 4 in transmission of packets 1 and 2 to the terminal 10 and apply radio section-dedicated QoS parameter 5 in transmission of packet 3 to the terminal 10, so as to transmit these packets 1, 2, and 3 at 1:N radio section-dedicated QoS levels generated by converting the QoS levels applied by the core network 20 into the radio section-dedicated QoS levels.

As described above, in the radio section QoS control method according to the present disclosure, it is possible to derive effects of applying a more differential QoS, that is, service qualities to communication services by implementing differential QoS control in the radio section in more detailed units without an increase in complexity and load compared to the conventional bearer-based QoS control method.

The implementations of the functional operations and subject matter described in the present disclosure may be realized by a digital electronic circuit, by the structure described in the present disclosure, and the equivalent including computer software, firmware, or hardware including, or by a combination of one or more thereof. Implementations of the subject matter described in the specification may be implemented in one or more computer program products, that is, one or more modules related to a computer program command encoded on a tangible program storage medium to control an operation of a processing system or the execution by the operation.

A computer-readable medium may be a machine-readable storage device, a machine-readable storage substrate, a memory device, a composition of materials influencing a machine-readable radio wave signal, or a combination of one or more thereof.

In the specification, the term "system" or "device", for example, covers a programmable processor, a computer, or all kinds of mechanisms, devices, and machines for data processing, including a multiprocessor and a computer. The processing system may include, in addition to hardware, a code that creates an execution environment for a computer program when requested, such as a code that constitutes processor firmware, a protocol stack, a database management system, an operating system, or a combination of one or more thereof.

A computer program (also known as a program, software, software application, script, or code) can be written in any form of programming language, including compiled or interpreted languages, declarative or procedural languages, and it can be deployed in any form, including as a stand-alone program or module, a component, subroutine, or another unit suitable for use in a computer environment. A computer program may, but need not, correspond to a file in a file system. A program can be stored in a single file provided to the requested program, in multiple coordinated files (for example, files that store one or more modules, sub-programs, or portions of code), or in a portion of a file that holds other programs or data (for example, one or more scripts stored in a markup language document). A computer program can be deployed to be executed on one computer or on multiple computers that are located at one site or distributed across a plurality of sites and interconnected by a communication network.

A computer-readable medium suitable for storing a computer program command and data includes all types of non-volatile memories, media, and memory devices, for example, a semiconductor memory device such as an EPROM, an EEPROM, and a flash memory device, and a magnetic disk such as an external hard disk or an external disk, a magneto-optical disk, a CD-ROM, and a DVD-ROM disk. A processor and a memory may be added by a special purpose logic circuit or integrated into the logic circuit.

The implementations of the subject matter described in the specification may be implemented in a calculation system including a back-end component such as a data server, a middleware component such as an application server, a front-end component such as a client computer having a web browser or a graphic user interface which can interact with the implementations of the subject matter described in the specification by the user, or all combinations of one or more of the back-end, middleware, and front-end components. The components of the system can be mutually connected by any type of digital data communication such as a communication network or a medium.

While the specification contains many specific implementation details, these should not be construed as limitations to the scope of any disclosure or of what may be claimed, but rather as descriptions of features that may be specific to particular embodiments of particular disclosures. Certain features that are described in the specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

In addition, in the specification, the operations are illustrated in a specific sequence in the drawings, but it should be understood that the operations are not necessarily performed in the shown specific sequence or that all shown operations are necessarily performed in order to obtain a preferable result. In a specific case, multitasking and parallel processing may be preferable. Furthermore, it should not be understood that a separation of the various system components of the above-mentioned implementation is required in all implementations. In addition, it should be understood that the described program components and systems usually may be integrated in a single software package or may be packaged in a multi-software product.

As described above, specific terms disclosed in the specification do not intend to limit the present disclosure. Therefore, while the present disclosure was described in detail with reference to the above-mentioned examples, a person skilled in the art may modify, change, and transform some parts without departing a scope of the present disclosure. The scope of the present disclosure is defined by the appended claims to be described later, rather than the detailed description. Accordingly, it will be appreciated that all modifications or variations derived from the meaning and scope of the appended claims and their equivalents are included in the range of the present disclosure.

What is claimed is:

1. A Base Station (BS) apparatus comprising:
   a processor; and
   a memory storing
       a program to be executed by the processor, and
       a mapping rule in which a first plurality of Quality of Service (QoS) parameters of a wireless network is mapped to a second plurality of QoS parameters of a service flow of a packet to be transmitted to a terminal in the wireless network, respectively,
   wherein the processor is configured to, by executing the program stored in the memory,
       identify a first QoS parameter, among the first plurality of QoS parameters, which is mapped to a second QoS parameter, among the second plurality of QoS parameters, applied to the service flow of the packet; and
       transmit, through the wireless network, the packet by applying the identified first QoS parameter mapped to the second QoS parameter which is applied by a core network, and
   wherein the processor is configured to transmit an Radio Resource Control (RRC) message including QoS control information to identify the first QoS parameter to the terminal, thereby allowing the terminal to transmit an uplink packet of the service flow by applying the identified first QoS level, based on the QoS control information within the RRC message.

2. The BS apparatus of claim 1, wherein the number of QoS parameters in the second plurality of the QoS parameters mapped within the mapping rule is larger than the number of QoS parameters in the first plurality of the QoS parameters mapped in the mapping rule.

3. The BS apparatus of claim 1, wherein two or more different QoS parameters in the second plurality of the QoS parameters are mapped to one QoS parameter among the first plurality of QoS parameters in the mapping rule.

4. The BS apparatus of claim 3, wherein the two or more different QoS parameters are applied to an Internet of Things (IoT) service or a communication service in which the core network periodically transmits a small amount of data having a size equal to or smaller than a particular size.

5. The BS apparatus of claim 1, wherein two or more QoS parameters in the first plurality of QoS parameters are mapped to a particular QoS parameter applied to each content included in one service flow in the mapping rule.

6. The BS apparatus of claim 5, wherein the particular QoS parameter has a service type of a non-Guaranteed Bit Rate (GBR) that does not guarantee a bandwidth.

7. The BS apparatus of claim 5, wherein, when the second QoS parameter applied to the one service flow is the particular QoS parameter, the processor is configured to check a particular field for identifying a service quality type (DiffServ) in a header of the packet to identify the second QoS of content and identify the first QoS parameter mapped to the identified second QoS parameter of content.

8. A method of controlling a Quality of Service (QoS) in wireless network, the method executed by a Base Station (BS) apparatus comprising a processor and a memory, the method comprising:
   storing, in the memory, a mapping rule in which a first plurality of QoS parameters of the wireless network is mapped to a second plurality of QoS parameters of a service flow of a packet to be transmitted to a terminal in the wireless network, respectively;

identifying, based on the mapping rule, a first QoS parameter, among the first plurality of QoS parameters, which is mapped to a second QoS parameter, among the second plurality of QoS parameters, applied to the service flow of the packet;

transmitting an Radio Resource Control (RRC) message including QoS control information to identify the first QoS parameter to the terminal, thereby allowing the terminal to transmit an uplink packet of the service flow by applying the identified first QoS level, based on the QoS control information within the RRC message; and transmitting, through the wireless network, the packet by applying the identified first QoS parameter mapped to the second QoS parameter which is applied by a core network.

9. The method of claim 8, wherein the number of QoS parameters in the second plurality of the QoS parameters mapped within the mapping rule is larger than the number of QoS parameters in the first plurality of the QoS parameters mapped in the mapping rule.

10. The method of claim 8, wherein two or more different QoS parameters in the second plurality of the QoS parameters are mapped to one QoS parameter among the first plurality of QoS parameters in the mapping rule.

11. The method of claim 8, wherein two or more QoS parameters in the first plurality of QoS parameters are mapped to a particular QoS parameter applied to each content included in one service flow in the mapping rule.

12. The method of claim 11, wherein the identifying comprises, when the second QoS parameter applied to the one service flow is the particular QoS parameter, checking a particular field for identifying a service quality type (DiffServ) in a header of the packet to identify the second QoS parameter of content and identifying the first QoS parameter mapped to the identified second QoS parameter of content.

* * * * *